United States Patent [19]

Green et al.

[11] 3,789,226

[45] Jan. 29, 1974

[54] X-RAY TIRE INSPECTION MACHINE

[75] Inventors: Donald T. Green, Mentor; James L. Snarr, Eastlake, both of Ohio

[73] Assignee: Imagex, Inc., Mentor, Ohio

[22] Filed: Sept. 1, 1972

[21] Appl. No.: 285,743

[52] U.S. Cl. ................. 250/360, 250/460, 250/492, 33/174 L
[51] Int. Cl. ............................................. G01j 39/18
[58] Field of Search .. 250/83.3 D, 52, 53, 360, 460, 250/492; 33/174 L

[56] References Cited
UNITED STATES PATENTS

| | | | |
|---|---|---|---|
| 3,550,443 | 12/1970 | Sherkin........................... | 250/83.3 D |
| 2,272,893 | 2/1942 | Bosomworth................... | 250/83.3 D |
| 3,417,476 | 12/1968 | Martens .......................... | 33/174 L |
| 3,604,248 | 9/1971 | Altmann........................... | 33/174 L |
| 3,621,247 | 11/1971 | Lide................................. | 250/53 |
| 3,621,246 | 11/1971 | Horsey............................. | 250/53 |

Primary Examiner—James W. Lawrence
Assistant Examiner—Harold A. Dixon
Attorney, Agent, or Firm—Harold S. Meyer

[57] ABSTRACT

An X-Ray tire inspection machine for automatic handling of tires and display of X-Ray shadow pictures of every part of the circumference of the tires includes devices for measuring each of a random succession of tires of differing sizes, positioning each tire in turn with the axis of an X-Ray imaging system in the midplane of the tire, spreading the beads of the tire sufficiently to avoid presence of more than one part of the tire in any ray of the X-Ray beam, stepwise rotation of the tire and successive display of X-Ray shadow pictures of each portion of the circumference of the tire while in a stationary position, marking the approximate location of each defect or other noteworthy observed feature and diversion of the marked tire, and dispatching toward their destinations the tires not marked for diversion. The machine may scan a single zone of the tire such as the tread, or may scan tread and sidewalls successively with a single imaging system or simultaneously with a group of imaging systems.

15 Claims, 16 Drawing Figures

PATENTED JAN 29 1974

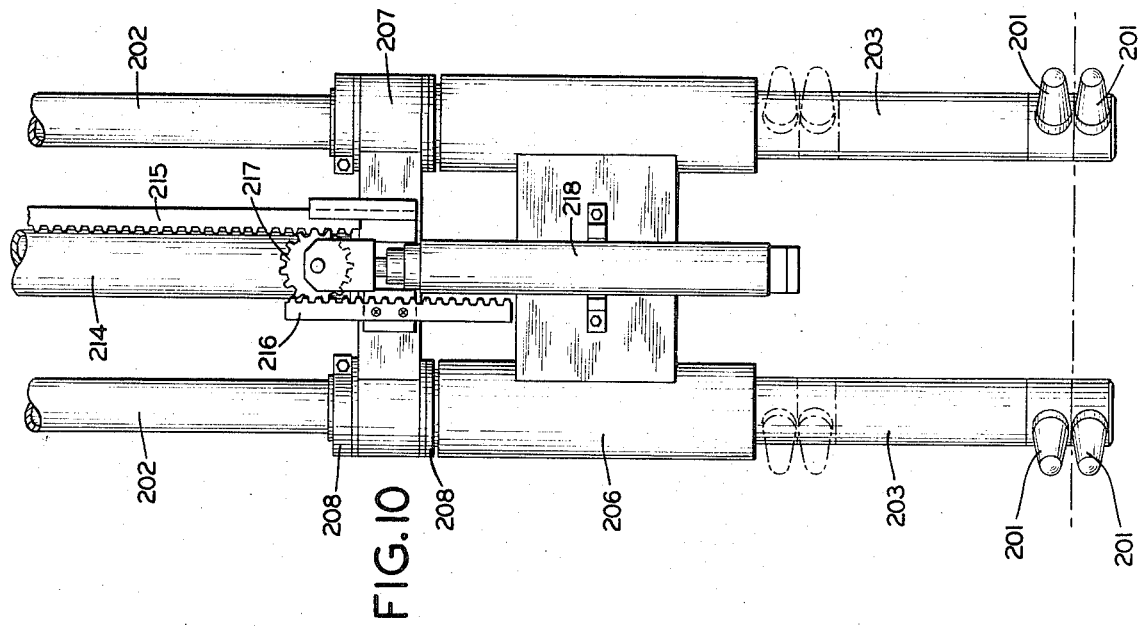
FIG.10
FIG.9
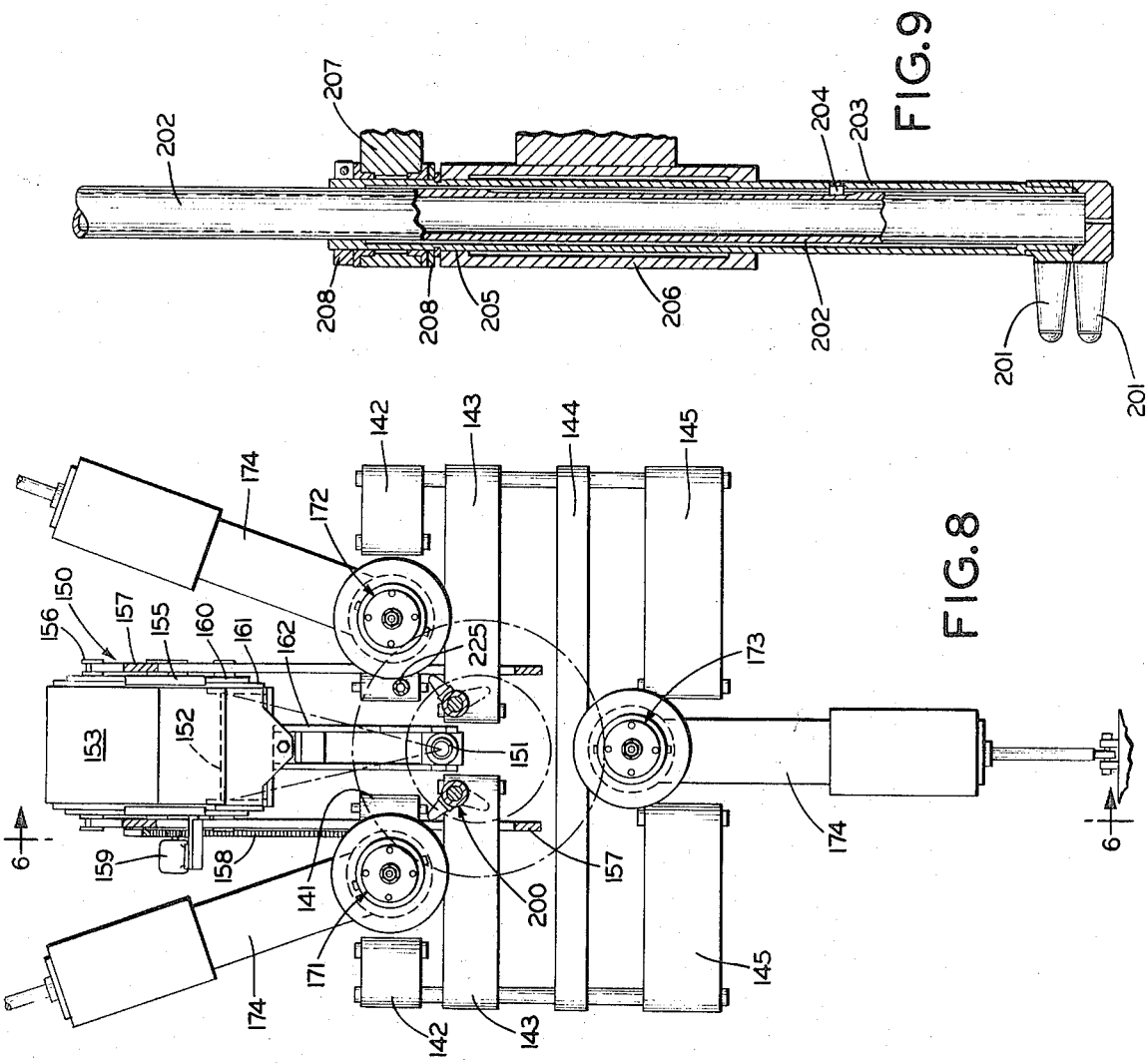
FIG.8

X-RAY TIRE INSPECTION MACHINE

CROSS REFERENCE

The X-Ray imaging system used in this invention is the subject of our application for patent Ser. No. 218,724 filed Jan. 18, 1972.

BACKGROUND OF THE INVENTION

Pneumatic tires for high speed vehicles are required to be made with considerable precision in order to deliver satisfactory service and not fail while the vehicle is in rapid motion. Inspection of the finished tires by ordinary means fails to indicate whether internal components are properly located, and attempts have been made to inspect tires by X-Ray examination.

Direct fluoroscopic examination may involve exposure of operators to harmful radiation, and tends to be lacking in contrast so that defects are difficult to detect. Accordingly, tires have been examined by video transmission fluoroscopic images, often with image intensification, to television monitors at a convenient location other than that of the X-Ray equipment, but this has been found to be so slow and expensive as to be unsatisfactory for use as a routine inspection procedure for determining absence of defects in actual production of tires.

An object of this invention, accordingly, is to provide equipment for automatically exposing pneumatic tires to fluoro-scopic X-Ray examination in such manner as to permit complete observation of the entire internal construction of a series of tires in rapid sequence.

SUMMARY OF THE INVENTION

In this invention finished pneumatic tires from the molding presses are transmitted to the X-Ray inspection machine as a continuous sequence on a suitable conveyor such as is conventionally used in handling tire production.

The tires are admitted to the X-Ray inspection machine one by one and their size is measured by devices which automatically determine overall diameter, section height, and section width. The tire is then automatically positioned with respect to the axis of the X-Ray beam of an X-Ray generator so that the window of the generator is a predetermined distance from the tire beads with the beam passing through the tire wall from the inside.

Preferably the window of the X-Ray generator is inside the circle of the tire beads, either a fixed small proportion of the bead diameter away from the tire bead circle, or a fixed small distance from the tire bead circle. The X-Ray generator is preferably mounted on a common base with a fluoroscope screen on the outside of the tire to maintain proper alignment of these components.

If a single zone only of the tire requires inspection, say the tread zone, the X-Ray generator and fluoroscopic screen will ordinarily have an axis in a fixed direction, or even in a permanently fixed location. If the entire tire wall is to be examined, bead spreaders will be provided to flex the sidewalls into positions transverse to the X-Ray beams. In addition, the base on which the generator and screen are located may be tilted into a succession of positions so that the entire tire wall will be examined in a succession of zones one after the other. For more rapid operation, a plurality of generator and fluoroscopic screen pairs are mounted in close proximity with axes so directed that each will inspect one of a number of overlapping tire zones, to permit completion of the tire inspection operation in one rotation of the tire.

When the position of the tire with respect to the X-Ray instrumentalities is established, by motion of locating elements, the tire is advanced between the X-Ray generator and fluoroscopic screen by rotation through at least one complete revolution, or so nearly a complete revolution that every circumferential part of the tire is examined.

The revolution of the tire is preferably conducted in a stepwise manner so as to eliminate "ghosts" and fuzziness caused by persistance of electrical images of moving objects in the video part of the system, and the X-Ray image is preferably stored for display during an entire time cycle, including not only the time of exposure, but also the time required for advancing the tire to its next circumferential position. This mode of operation confronts the observer with a succession of still pictures, each of which persists until the next one is displayed, which permits most effective judgment as to whether a defect is or is not present in the particular part of the tire pictured on the monitor.

On completion of the examination cycle, those machine components which are in the path of exit motion of the tire, are drawn aside automatically, the tire is discharged, and the next tire in sequence is delivered by the conveyor. The machine then starts another cycle of measurement of the newly presented tire, positioning it with respect to the X-Ray equipment, rotating it for circumferential inspection, and discharging it on the exit conveyor.

A diversion gate is provided so that a tire exhibiting an actual or suspected defect can be diverted from the exit conveyor for more detailed examination or repair or disposal.

DRAWINGS

In the accompanying drawings, FIG. 1 is a top view of the machine.

FIG. 8 is a partial top view corresponding to FIG. 6.

FIG. 9 is a vertical section through one of the two pairs of bead spreaders.

FIG. 10 is an elevation of the supporting structure for both pairs of bead spreaders, including the lifting mechanism.

Figure 12:
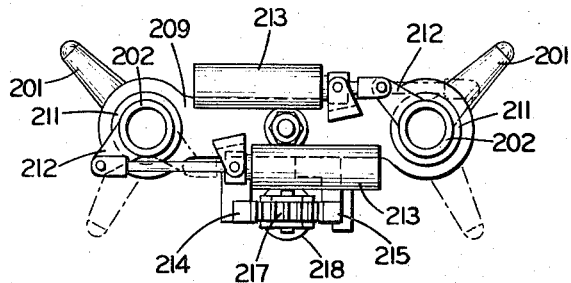
Figure 13:
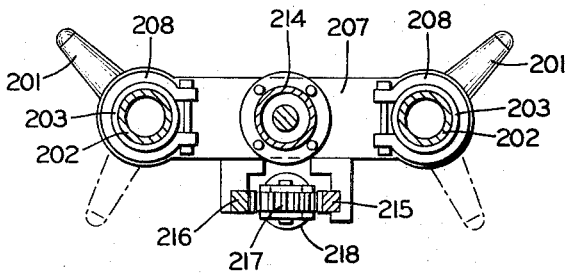
Figure 14:
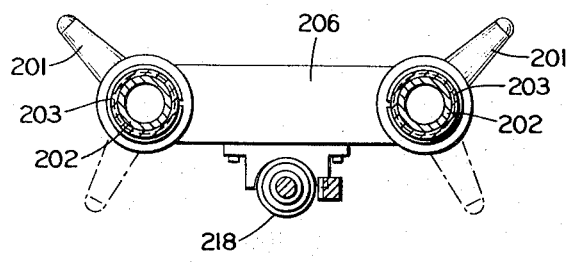
Figure 11:
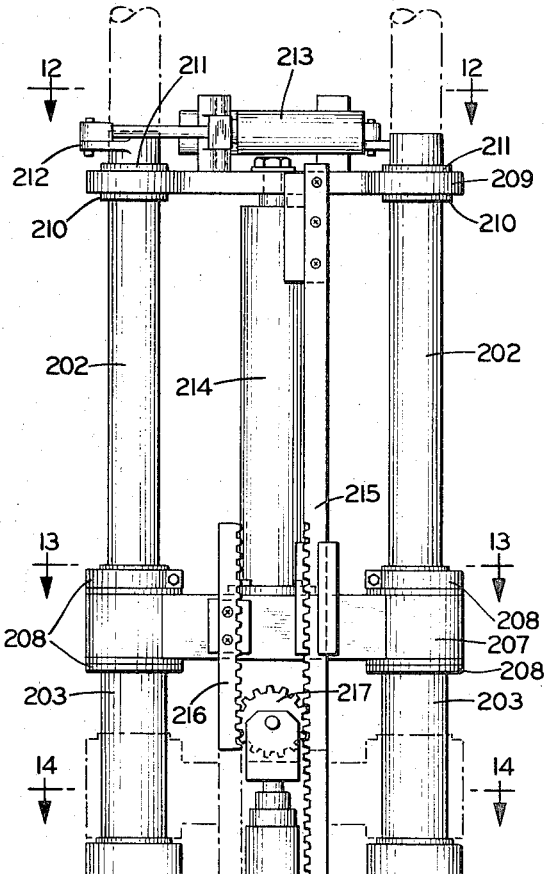
FIG. 11 is an elevation of the bead spreaders showing the spreading and swiveling mechanisms.
Figure 15:
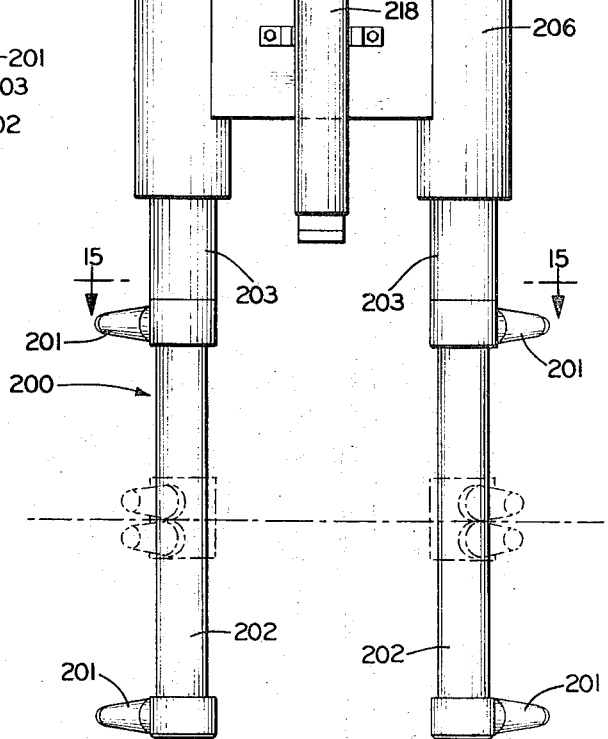

FIG. 12 is a section on line 12—12 of FIG. 11.
FIG. 13 is a section on line 13—13 of FIG. 11.
FIG. 14 is a section on line 14—14 of FIG. 11.
FIG. 15 is a section on line 15—15 of FIG. 11.

Figure 16:
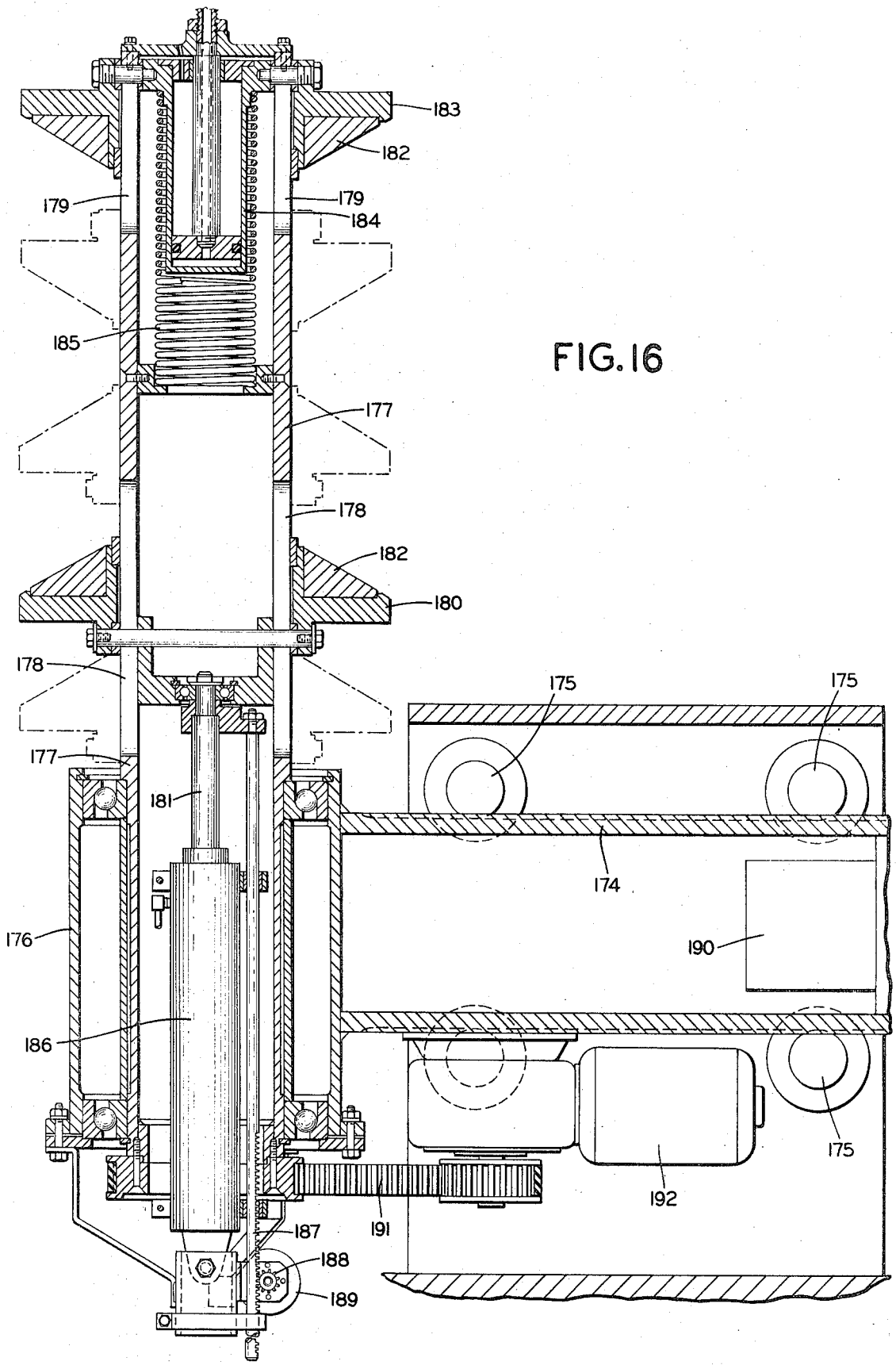

FIG. 16 is an enlarged vertical section of a tire supporting spool.

DETAILED DESCRIPTION

In the following description, and in the drawings, structures which are merely immovable supports are ommited for clarity of presentation.

Figure 1:
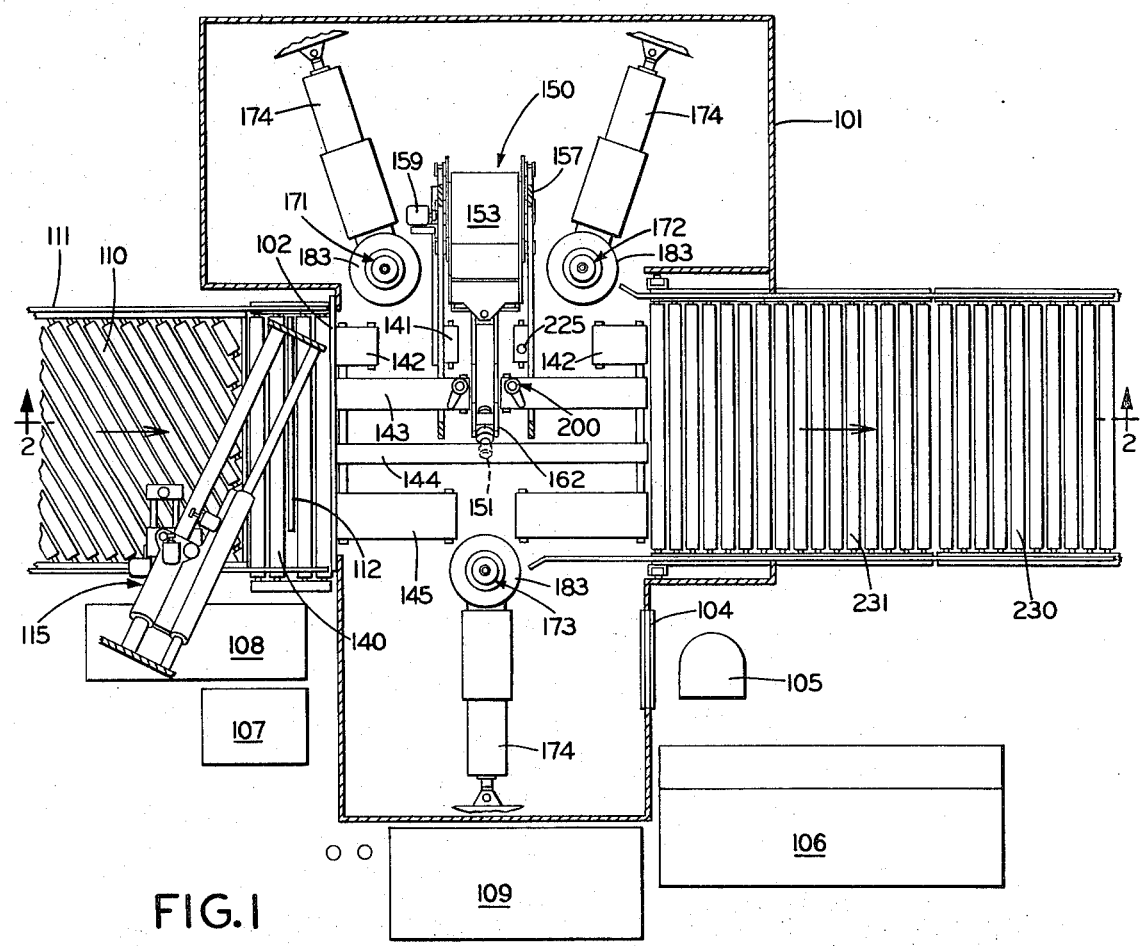
Figure 2:
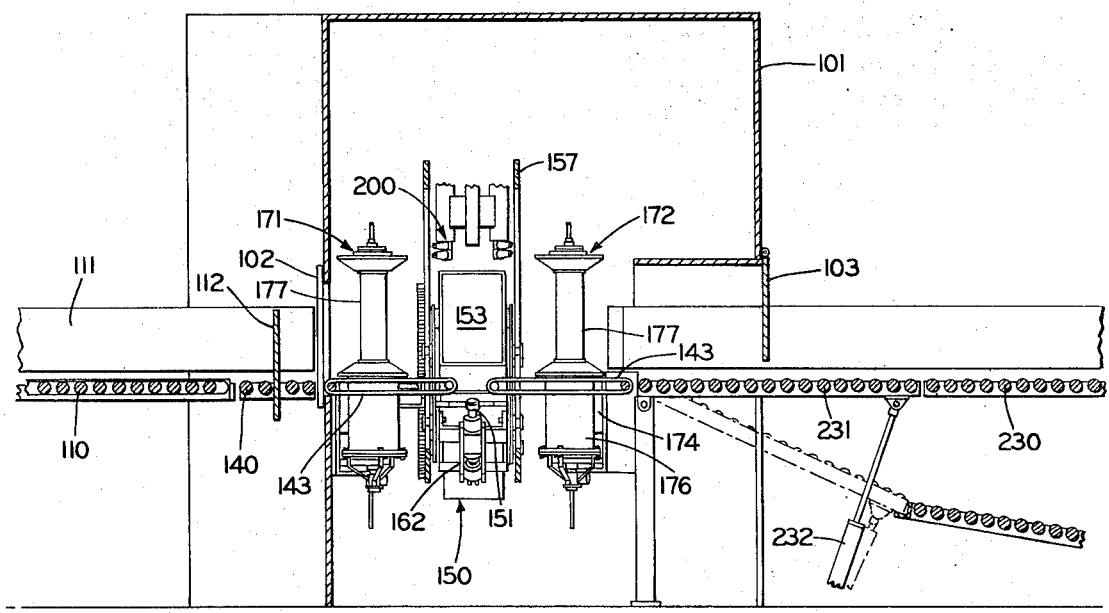
FIG. 2 is a vertical section of part of the machine on line 2—2 of FIG. 1.

Referring to FIGS. 1 and 2, the tire inspection machine of this invention is enclosed in a radiation shield, which may take the form of a closed chamber 101 of lead or other dense material having an admission door 102 and a discharge door 103 which may be moved vertically or horizontally to permit passage of the individual tires.

A lead glass window 104 may also be provided so that an operator outside the chamber can observe the operation of the mechanical part of the equipment without exposure to the X-Rays. An operator's seat 105 and operating console 106 may be located near the window.

The console 106 includes appropriate controls for starting and stopping the machine, for choice of various modes of operation such as single zone inspection (such as the tread zone only) or multiple zones (such as tread and each sidewall successively), for marking a defective segment and deviation of the defective tire for special treatment, and for operation and adjustment of the imaging system. It also includes one or more television monitors for viewing the X-Ray shadow pictures, and may include a recording device for subsequent display of the pictures. In addition, the console includes a computer or program device of a conventional kind for translating measurements or instructions by the operator into impulses for activating, or controlling operation of, various mechanisms in properly timed sequence.

The machine also includes such necessary auxiliaries as a cooling system 107 for the X-Ray tube, and electric transformers 108, as well as fluid pumps 109 for hydraulic fluid and air for supply of power to the various operating cylinders throughout the machine.

The tire inspection machine may be located in the line of the conveyor carrying finished tires from the vulcanizing presses to warehousing or shipping locations. Such conveyors are suitably either driven roller conveyors or gravity operated roller conveyors, which will deliver tires to the tire inspection machine in a horizontal posture.

Since the functional parts of the machine require precise placement in varying positions depending on the size of the tires being handled, and since the tires must be delivered in a suitable functional relationship to these parts, the input conveyor is arranged for preliminary delivery of the tires to a measuring station outside of the chamber 101. For this purpose, a short length of the input conveyor is provided with skewed rolls 110 which cause the tires to move against and along a lateral fence 111 until arrested by a vertically movable stop 112.

Figure 3:
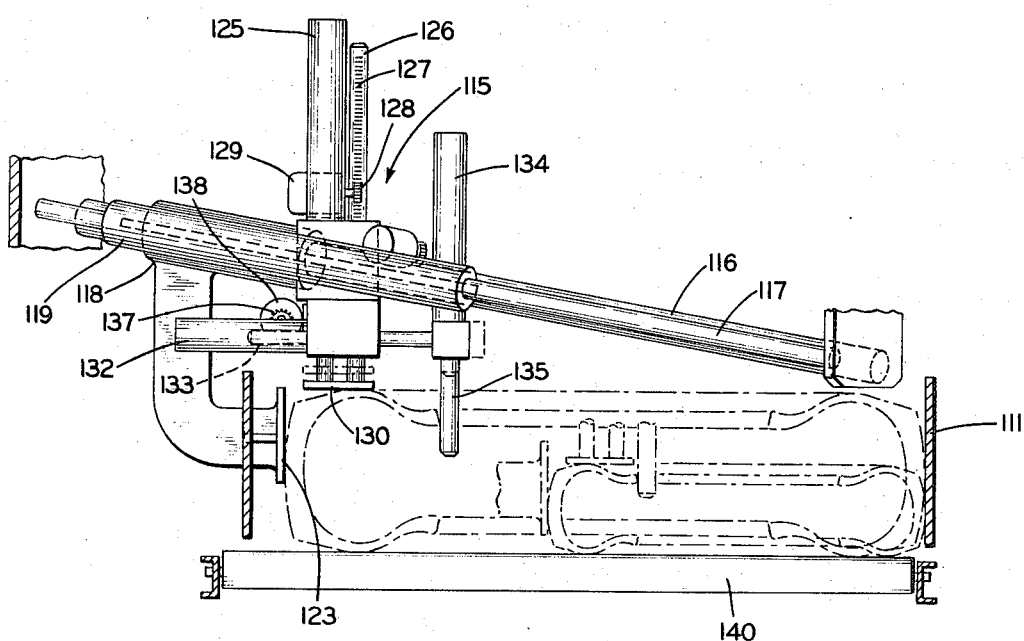
FIG. 3 is a vertical section on lines 3—3 of FIG. 4, showing the tire measuring devices.
Figure 4:
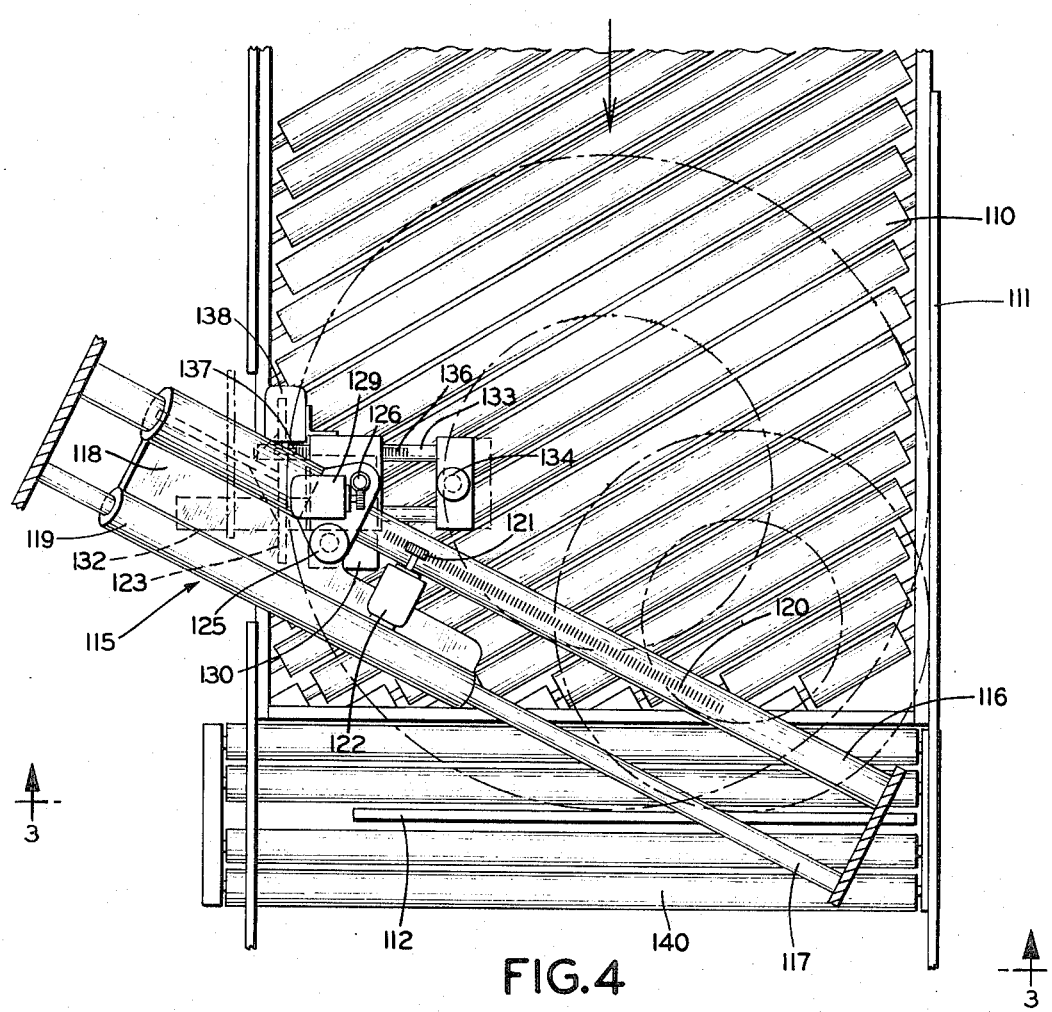
FIG. 4 is a top view of the measuring devices of FIG. 3.

The measuring devices indicated generally by 115 in FIG. 1 are shown in more detail in FIGS. 3 and 4, in whcih the positions of a large tire and of a small tire, both resting against fence 111 and stop 112 are shown in dot-dash lines. These devices are designed to measure overall diameter, width, and section height (which means the distance from the base of the bead to the face of the tread) which are the critical dimensions for the purpose of this invention. There are, accordingly, three separate units on one support for these three measurements.

The support for the measuring devices 115 may take the form of a pair of parallel rods 116 and 117 mounted in angular positions with respect to the fence 111 and stop 112. The angle with respect to the horizontal (as shown in FIG. 3) is such as to be approximately parallel to a line joining the center of the face of the tread of the largest tire which the machine will admit and of the smallest tire which the machine can handle, when the opposite points on the treads are resting against fence 111, and may be of the order of 10° to 20°, depending on the particular range of sizes which a machine is designed to handle. The angle with respect to the stop 112, that is, the projection of that angle on a horizontal plane (as shown in FIG. 4) should approximate the angle whose tangent is one half, namely 26° 34′, since a line at that angle is the locus of all points of contact of a plane parallel to fence 111 with tires of varying sizes resting against fence 111 and stop 112.

A slide 118 movable along rods 116 and 117 is actuated by a double-acting piston 119 on one of the rods. The other rod has rack teeth 120 cut along its length and has a pinion 121 engaging the teeth and actuating a pulse generator 122. Affixed to the slide 118 is a vertical sensing plate 123, parallel to fence 111. After a tire comes to rest against fence 111 and stop 112, slide 118 is urged toward fence 111 by piston 119 until plate 123 comes in contact with the tire. During this motion, pulse generator 122 transmits signals indicating the difference between original distance of plate 123 from fence 111 and the distance when plate 123 is in contact with the tire, and therefore indicating the diameter of the tire. These signals are stored in a computer.

Integral with slide 118, or fastened to it, is a vertical double-acting cylinder 125, parallel to which is a guide rod 126 having rack teeth 127 engaging pinion 128 on the shaft of a pulse generator 129. The piston of cylinder 125 and guide rod 126 support a horizontal sensing plate 130. After the motion of slide 118 stops, plate 130 is moved downward by cylinder 125 until it stops by contact with the sidewall of the tire. Signals from pulse generator 129, indicating tire width, are stored in a computer.

A third double acting cylinder 132 with a horizontal axis perpendicular to fence 111, and guide rod 133, are mounted on slide 118. Attached to the piston of cylinder 132 and to rod 133 is a vertical double acting cylinder 134 which raises and lowers sensing rod 135. Guide rod 133 has rack teeth 136 meshing with pinion 137 on the shaft of pulse generator 138. Simultaneously with lowering of width sensing plate 130, sensing rod 135 is lowered, and is then drawn by horizontal cylinder 132 against the tire bead. Signals from pulse generator 138, indicating tire section height, are stored in a computer.

After transmittal of the three sets of signals indicating tire diameter, width, and section height, sensing rod 135 is moved away from the tire bead and then raised, tire width sensing plate 130 is lifted, and the entire set of measuring devices including vertical sensing plate 123 is moved in the direction away from fence 111 so as to be completely out of the path of all tires on rolls 110.

On completion of the measuring operation, if there is no tire within the chamber 101, door 102 is opened, stop 112 is withdrawn, and the measured tire is transmitted into chamber 101 by driven conveyor rolls 140 outside the chamber and rolls 141 and belts 142, 143, 144, 145 inside the chamber. Rolls 141 and belts 143 are spaced to provide room for the X-Ray image system. Short belts 142 are spaced from rolls 141 to leave room for tire supporting spools 171 and 173. Belts 145 are spaced to leave room for tire supporting spool 172.

The three tire supporting spools 171, 172, 173 are identical in construction and have the functions of supporting the tire being inspected in the proper position with respect to the X-Ray image system, and rotating the tire. To perform these functions, the spools are retractible out of the path of the incoming and outgoing tire and are vertically movable to lift the tire to the desired position, as will be described in more detail below.

When a tire is held in the proper position for X-Ray examination by supporting spools 171, 172, 173, bead spreaders, indicated generally by 200, will engage the two beads of the tire in slightly spaced locations and separate the beads, so that the X-Rays can be directed through each part of the tire without interference by other parts of the tire. The bead spreaders 200 are retractible to permit placement and removal of tires, and are described in more detail below.

The X-Ray imaging system used in this invention preferably includes an X-Ray tube 151 within the bead circle of the tire, and suitable imaging means designated generally by 150 outside of the tire. As mentioned above, the imaging means 150 is preferably arranged for transmitting the image to a monitor forming a part of the operator's console 106, outside of the radiation shielding chamber 101.

Figure 6:
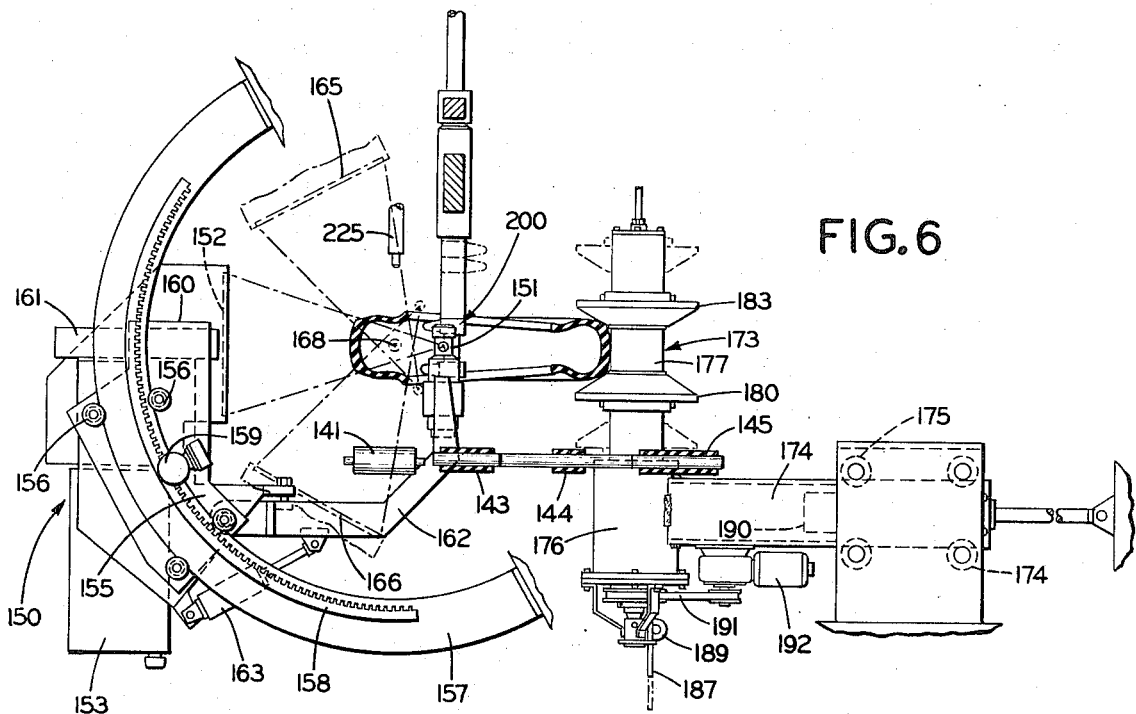
FIG. 6 is a section similar to FIG. 5 showing the relation of the same parts to a small tire.
Figure 5:
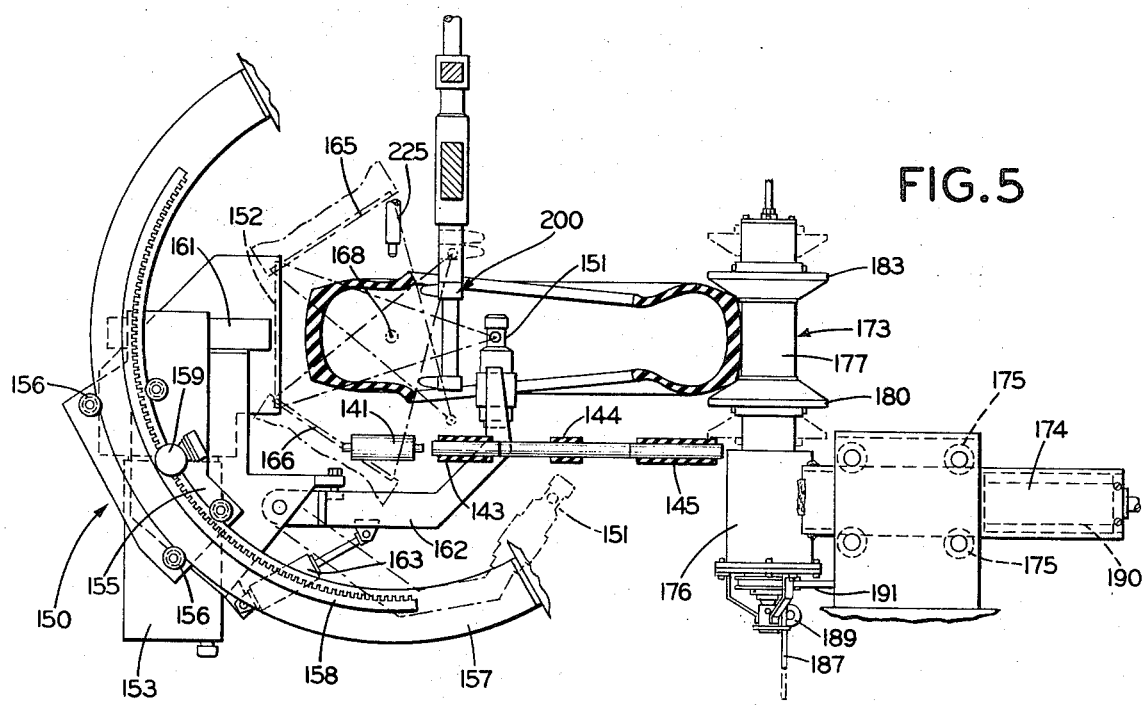
FIG. 5 is a vertical section on an enlarged scale showing the relation of various parts to a large tire.

In the embodiment shown in detail in FIG. 5 and FIG. 6, the preferred relation of parts is shown for inspection of a large tire (in FIG. 5) and a small tire (in FIG. 6), in a vertical section crosswise of the conveyor. Similar plan views are in FIG. 7 and FIG. 8, with the positions of the tires in dot-dash lines.

In this particular embodiment, a single imaging system is arranged for placement at varying angles to the central plane of the tire, to permit scanning of any desired zone of the tires, or sequential scanning of several zones, such as one sidewall zone followed by the tread zone and then the other sidewall zone. For this purpose the entire imaging system is supported by a carriage 155 moving on rollers 156 on a semicircular track 157 which in this case is actually a pair of parallel tracks. On one track is a curved rack 158. A cooperating pinion is driven by a motor 159 mounted on carriage 155. The motor is controlled by signals from a computer, for positioning the carriage 155 at the proper location for each stage of each tire inspecting operation.

Mounted on the carriage 155 is a pair of straight guide 160, generally radial with respect to curved track 157. In guides 160 are slides 161 attached to X-Ray imaging system 150 to permit its displacement toward and away from the center of curved track 157. This radial motion is produced by a double acting cylinder (not shown) controlled by signals from a computer, in a manner similar to control of tire supporting spools 171, 172, 173 as described below.

The imaging system 150 generally includes at least a fluorescent screen 152 and a television camera 153. To assure a definite relation of the X-Ray source to the imaging system in this embodiment, the X-Ray tube 151 is mounted on a rectractible arm 162, pivoted on the housing for camera 153 and actuated by cylinder 163. This permits the X-Ray tube 151 to be lowered below the several belts 142 to 145 while tires are moving to and from the examining location.

Preferably, this tire inspection machine will utilize the X-Ray inspection system of our prior application Ser. No. 218,724 filed Jan. 18, 1972 in which a tire is rotated stepwise, a still X-Ray picture of the tire on a fluorescent screen is viewed by an integrating camera tube, and the image on the target of the camera tube is transferred to a storage tube from which it is displayed continuously on a television monitor while the tire is moved to the next rotational position and exposed to the X-Ray beam for a subsequent picture. Accordingly, the tire supporting spools 171, 172 and 173 are connected to stepping motors which rotate them intermittently.

Referring to the sectional view of FIG. 16, each of the tire supporting spools 171, 172, 173 is supported by its own horizontal arm 174 moving linearly on flanged wheels 175 on its own fixed support. Arm 174 ends in a vertical sleeve 176 within which is journalled a tubular shaft 177 having lower slots 178 and upper slots 179. This shaft 177 is the actual drive member, together with similar shafts 177 of the other two tire supporting spools, for the stepwise rotation of the tire.

Each tire supporting spool has a lower flange 180 slidable on and rotatable with shaft 177, being pinned through lower slots 178 to the head of a piston rod 181. The upper surface of lower flange 180 is conical with a slope corresponding to that of a tire shoulder and is preferably of a low friction material 182 such as nylon or poly-tetrafluoroethylene so that driving torque will be transmitted by the cylindrical surface of tubular shaft 177 rather than by the flange.

Upper flange 183 is pinned through slots 179 to a cylinder 184 which is normally held raised by a spring 185 so that upper flange 183, when unrestrained, will be at the top of shaft 177. Cylinder 184 is connected by a swivel joint and a valve (not shown) to a source of compressed air. Upper flange 183, like lower flange 180, has a conical surface 182 faced with a low friction material.

Piston rod 181, which raises lower flange 180 of the tire supporting spool, is actuated by a hydraulic cylinder 186. Piston rod 181 is also connected to a rack 187 which engages a pinion 188 on the shaft of a pulse generator 189. This permits the machine to lift lower flange 180, and therefore a tire supported on it, until the pulses of generator 189 equal the number corresponding to the half width of a particular measured tire, whereupon the computer receiving the pulses will close the hydraulic valve to cylinder 186 and maintain the tire supported on the flanges 180 of all three tire supporting spools 171, 172, 173 at the proper level for X-Ray inspection.

Horizontal motion of each tire supporting spool is brought about by another hydraulic cylinder 190 inside arm 174, provided with a rack and pinion connected to a pulse generator (not shown) similar to rack 187, pinion 188, and pulse generator 189 for the vertical movement. Thereby mechanically controlled positioning of the spools to engage and support each size of tire is assured.

The tubular shaft 177 is driven through a positive drive belt 191 from a stepping motor 192, which provides the desired timed stepwise advance of the tire.

Proper examination of tires is assisted by spreading of the beads. This is particularly required if the sidewalls or the beads are to be examined, since it is otherwise nearly impossible to direct X-Ray beams approximately perpendicular to these portions of a tire. In this machine, bead spreaders 200 are provided, in the form of two pairs of freely rotatable fingers which are swung out of the way and lifted out of the path of the incoming and outgoing tires. When a tire is in place, the bead spreaders are positioned in the mid-plane of the tire near the beads, the fingers are turned to penetrate the space between the tire beads, and the fingers of each pair are forcefully separated to spread the beads to a position in which satisfactory X-Ray examination is possible. The beads are spread in the arc of the tire which is currently undergoing examination, so that, as the tire is rotated, the beads approaching the X-Ray beam are separated and the beads as they leave the X-Ray beam are allowed to return to their normal spacing.

Referring to FIGS. 9 through 15, the bead spreaders 200 are shown in FIG. 11 in their separated position and in FIG. 10 in their collapsed position in which they are introduced between the beads or removed from between the beads of a tire. The bead spreaders consist of two pairs of rotatable fingers 201 on anti-friction bearings so that they will not resist rotary motion of the tire. These fingers 201 project horizontally from the lower ends of two pairs of concentric tubular vertical shafts. Thus one finger 201 projects from the tip of internal shaft 202 and another finger 201 projects from the end of an outer shaft 203 fitting snugly around shaft 202. A key 204 fits in opposing keyways of the shafts so that they can slide lengthwise but are forced to rotate in unison.

The outer shaft 203 of each pair fits in one of a pair of vertical journals 205 in a fixed support 206, in which shaft 203 can both rotate and slide longitudinally. The upper end of outer shaft 203 passes through a hole in one end of a lower yoke 207, the other end of which has a similar hole to receive the end of the other outer shaft 203. A pair of fixed rings 208 on outer shaft 203 permits rotation within yoke 207 but prevents sliding motion. Each inner shaft 202 projects considerably above outer shaft 203, and its upper end passes through a hole in one end of an upper yoke 209 similar to lower yoke 207. A lower fixed ring 210 on each inner shaft 202 prevents motion in one direction. An upper fixed ring 211 on each inner shaft 202 has an arm 212 connected to the piston of a cylinder 213 connected to the upper yoke 209. Thus cylinders 213 swivel inner shaft 202 and outer shaft 203 of each pair through a predetermined angle, as shown in FIG. 12.

The two yokes 207 and 209 are connected by a cylinder 214, the operation of which separates the yokes and thereby causes the opposite ends of inner shaft 202 and outer shaft 203 to come together, thus bringing the pair of fingers 201 into juxtaposition.

Upper yoke 209 bears a downwardly extending rack 215, and lower yoke 207 bears an upwardly extending rack 216, both of which mesh with a pinion 217. The pinion 217 is journaled in the forked head of the piston of a cylinder 218 fastened to the fixed support 206, as shown in FIG. 14.

Figure 7:
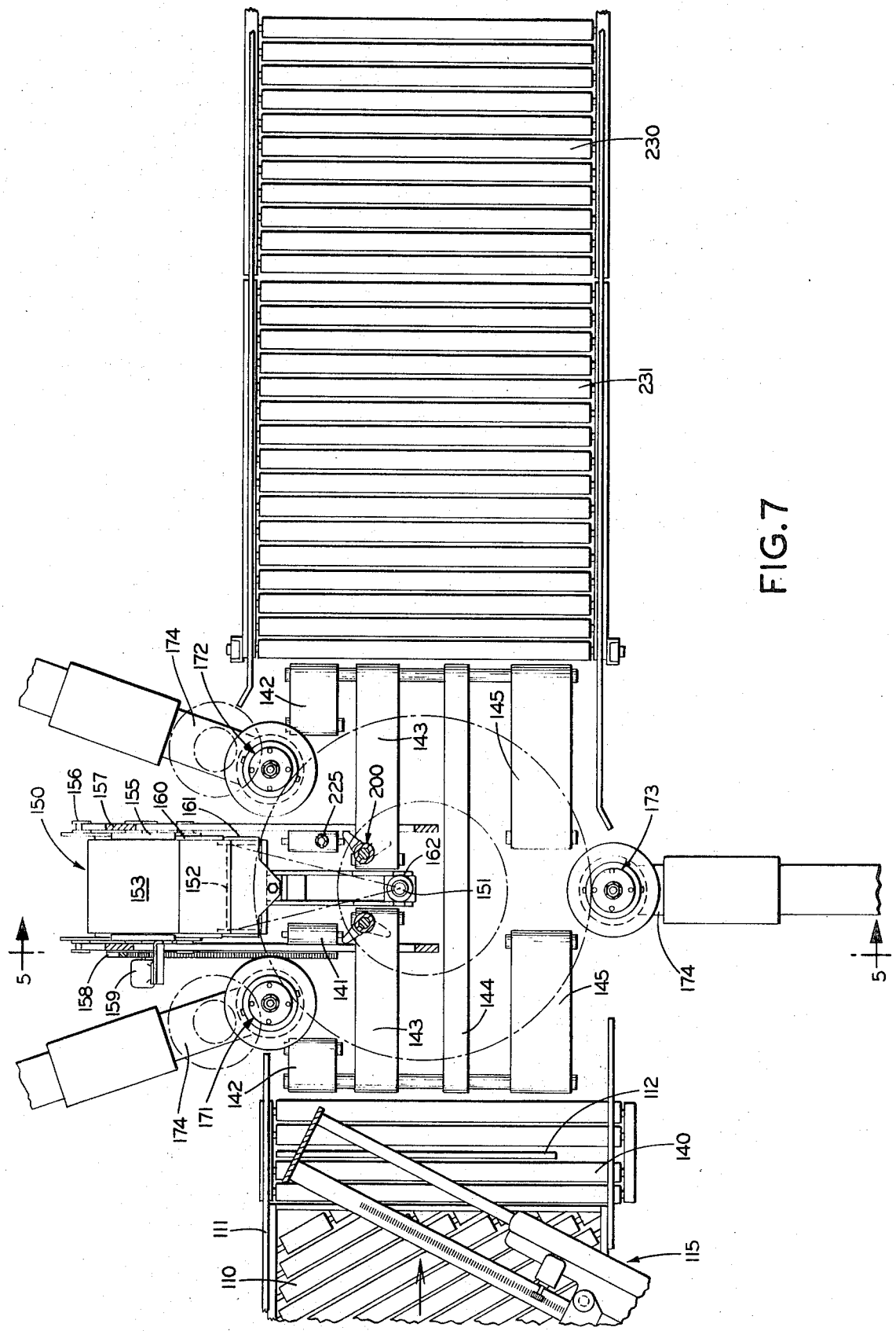
FIG. 7 is a top view corresponding generally to FIG. 5.

It is apparent that when finger 201 on inner shaft 202 and outer shaft 203 are adjacent, as shown in solid lines in FIG. 10, operation of cylinder 218 will cause pinion 217 to bear equally on rack 215 on upper yoke 209 an on rack 216 on lower yoke 207, thus lifting the spreader to the position shown in dot-dash lines in FIG. 10, to clear tires moving in or out of the machine. When a tire is in place, cylinder 218 is released to drop fingers 201 to their operating position. Both cylinders 213 are then simultaneously activated to swivel fingers 201 into position between the beads of the tire, as shown in FIG. 7 and FIG. 8. Cylinder 214 is then activated to separate fingers 201 of each pair as shown in solid lines in FIG. 11, to lift the upper bead of the tire and depress the lower bead, with pinion 217 acting on the two racks 214 and 215 to assure equal motion to maintain symmetry of the portion of the tire being subjected to X-Ray inspection. On completion of inspection, reverse motion successively of cylinders 214, 213, and 218 will first draw together the fingers 201 of each pair, swivel them out of the space between the tire beads, and lift them to clear the tire so it can be removed.

The X-Ray imaging system 150 used in this machine includes an X-Ray tube 151 of suitable design. This is preferably one which will produce a shadow picture of maximum contrast when penetrating materials differing only slightly in density, such as a ceramic tube operating at a relatively low voltage such as 15 KV. It is associated with a fluorescent screen 152 in a light tight camera 153 preferably having a 45° mirror to reflect the image out of the X-Ray beam.

Because of the low intensity of low voltage X-Ray pictures, it is desirable to intensify them, as taught in our previous application for patent Ser. No. 218,724. This is conveniently accomplished by focusing the picture on the fluorescent screen 152 by means of an optical lens on the target of an integrating television camera, preferably through one or more stages of light intensification. This results in formation of an intense image of satisfactory contrast, which is then transferred to a storage tube by snatch-scanning. The image in the storage tube is then displayed continuously on a television monitor at the operator's console 106.

When the foregoing kind of imaging system is used, the visualization of the internal structure of the tire by the X-Ray beam is terminated before commencement of display of the picture on the monitor, and during the display on the monitor the tire is rotated to a new inspection position from which a new image charge is accumulated on the target of the camera. Accordingly, the segment of the tire visualized on the monitor is no longer in the axis of the imaging system but is one step removed.

Over the portion of the tire visualized on the monitor is an ink spray 225. If the tire indicated in dot-dash lines in FIG. 7 is rotated stepwise in a clockwise direction, the spray 225 is just outside of the X-Ray beam in a clockwise direction.

Opposite to the input conveyor 140 is an exit conveyor 230, which may be a gravity or power driven roller conveyor. It is preferably equipped with a diversion gate, here shown as a short panel 231 of the conveyor rolls which may be swung down to a lower level by an operating cylinder 232, as shown in FIG. 2.

The operation of the foregoing embodiment is as follows.

After the last previous tire was examined, bead spreaders 200 will have been raised, X-Ray tube 151 will have been lowered, the tire will have been disengaged by lifting of upper flange 183 and lowering of lower flange 180 of each of the tire supporting spools 171, 172, 173 to deposit the tire onto continuously moving belts 142, 143, 144, and 145, followed immediately by horizontal withdrawal of the spools 171, 172, 173, so that the tires are moved out through the discharge door 103 which may be a flap of X-Ray opaque flexible material. This leaves the machine ready to receive another tire.

A succession of tires moving toward the X-Ray tire inspection machine arrive one by one on the skewed rolls 110 and are guided along fence 111 until the first one reaches stop 112. The measuring devices 115 are moved into contact with the tire and the three critical dimensions are transmitted to a computer, as previously described. Stop 112 is withdrawn, door 102 opens and the measured tire is advanced into the chamber 101 on the continuously driven belts 142, 143, 144, and 145.

The diameter of the tire is immediately translated into position numbers for horizontal positioning of tire supporting spools 172 and 173, and they are advanced to that position by cylinders 190 under the control of the computer. If the tire is the largest which the machine will accommodate, as indicated in the dot-dash lines in FIG. 7, these positions will be such as to arrest the tire with its center aligned with the axis of the imaging system and with the tread in approximate alignment with fence 111. The third spool 171 is then advanced to its position, symmetrically spaced with respect to spool 172, for lightly gripping the tread of the tire.

The width of the tire is translated into position numbers for lifting lower flange 180 of each spool 171, 172, 173, under the control of the computer through pulse generator 189, to a position in which the mid-plane of the tire passes through the center of screen 152 when it is in its central position with the screen 152 vertical. At the same time upper flange 183 of each spool is lowered into contact with the tire.

Bead spreaders 200 are lowered into positions with fingers 201 symmetrically placed with respect to the mid-plane of the tire, and cylinders 213 are actuated to swivel the fingers 201 into position between the beads of the tire. The width of the tire is translated into position numbers for actuation of separating cylinder 214 under control of the computer for spreading the tire beads apart.

The section height of the tire is translated into position numbers for horizontal shifting of the entire image system — the X-Ray tube 151, screen 152, and camera 153 — with respect to the tire, so that the X-Ray beam will pass through a reasonable arc of the tire circle and also through a reasonable part of the width of the tire. In the case of the largest tire, as shown in FIG. 7, this will mean bringing the screen 152 close to the tire and the X-Ray tube 151 at a maximum spacing from the tread toward the center of the tire.

The X-Ray tube 151 is raised to its operating position in alignment with the axis of the fluorescent screen 152 and image system, and if not already activated, it is turned on, along with the television camera 153 with its associated storage tube and television monitor. After a predetermined exposure time, the computer causes the image in the television camera to be transferred to the storage tube and displayed on the monitor and also causes the stepping motors 192 to rotate the tire just enough to bring another portion of the tire into the X-Ray field with a slight overlap of the previously viewed portion. The machine proceeds automatically to rotate the tire stepwise and display the entire tread portion of the tire on the monitor at the console 106 as a succession of still pictures.

If the operator sees a defect or notes something which he considers to require more leisurely or thorough examination, he will actuate a reject control at the console 106. This will cause the ink spray 225 to discharge a bright colored ink on the part of the tire corresponding to the image displayed on the monitor, which will be the part adjacent to that momentarily in the X-Ray beam. It will also cause the diversion gate 231 to be dropped so that the tire, when its examination is completed, will be conveyed to a location where a further inspection and repair or final rejection can occur.

If no defect is noted, the computer will rotate the tire step-wise through a complete revolution and then release and withdraw bead spreaders 200, drop the X-Ray tube 151, lower and retract spools 171, 172, 173 to drop the tire again on belts 142 to 145 for discharge from the machine to shipping or storage.

If it is desired to inspect the entire tire including sidewalls, the computer will cause motor 159 to move carriage 155 upward on the curved track 157 to the screen position indicated at 165 on FIG. 5. After stepwise scanning of the upper sidewall, the carriage will be returned to its central position with the screen at position 152 for scanning the tread, and will then be lowered to position 166 for scanning of the lower sidewall, with corresponding motions of X-Ray tube 151 since it is supported on the same carriage as the screen and imaging system. The system is then automatically returned to a starting position.

Other sizes of tires are examined in the same manner, but with appropriately different relative locations of the tire and the imaging system. When the X-Ray tube is placed outside of the air space of a pneumatic tire, the geometry of the tire requires the X-Ray beam during examination of a sidewall to pass as closely as possible to the opposite bead. Consequently, it is convenient to tilt the entire imaging system about a fixed point 168 in space, which is the geometric center of semicircular track 157, and locate the tire and the imaging system with reference to this point.

In examining the largest tire, as described above, it was located with fixed point 168 within the air chamber of the tire at about the radial location of the merger of the tire beads with the sidewall, so that the X-Ray beam directed to the upper sidewall will clear the lower bead, and vice versa.

In examining smaller tires, and in particular in examining the smallest tire the machine is designed to handle, the computer will similarly translate the measured dimensions into position numbers for actuation of the several variably positioned machine elements. One set of elements is lower flanges 180, the height of which determines upward location of the tire, and which are calculated to place the tire with its mid-plane including fixed point 168. Another set is the horizontal motion of the axes of tire supporting spools 171, 172, 173 with the fixed point 168 at about the radial location of the merger of the beads and the sidewalls. Still another element is bead spreader fingers 201, the spacing of which determines the extent of opening of the beads for ease of examination. A further element is the X-Ray tube 151, spaced with respect to the fixed point 168 by motion of the imaging system along radial slides 161 to determine the area of the tire exposed to the conical X-Ray beam, a large spacing for exposing a large area at once on a large tire, and a small spacing for exposing a proportional and therefore smaller area on a smaller tire.

In comparing FIGS. 6 and 8 showing a small tire with FIGS. 5 and 7 showing a large tire, it will be noted that the foregoing relationships do not require repositioning of bead spreaders 200 (but only the different vertical spacing of fingers 201 for different size tires) since the greater curvature of the smaller tires compensates for their smaller bead dimensions and permits fingers 201 to engage satisfactorily the beads of a wide variety of sizes without change in location.

Other embodiments of this invention may have arrangements of the essential equipment differing more or less from that described above, either in the direction of increase in capacity by duplication of components, or in the direction of simplification if maximum capacity is not needed.

Instead of having one imaging system movable into several positions for scanning multiple zones of the tires, there may be multiple imaging systems mounted with their screens in positions such as are indicated at 152, 165, and 166 in FIGS. 5 and 6, together with a cluster of X-Ray tubes on a single support with their beams directed respectively at the several screens. In this case a group of monitors may be provided at the console 106, for viewing by the operator or a group of operators, so that the entire tire, including both beads and sidewalls and the tread, may be inspected in a single stepped revolution in minimum time.

On the other hand, if only the tread is to be examined, the semicircular track 157 and its carriage 155 can be omitted. If only a small range of sizes is to be inspected, the guide 160 and slides 161 may not be needed, and the imaging system can remain in a fixed location.

Moreover, with a narrow range of tire sizes, it may be possible to omit measurement of the tires and subject them to examination with their shoulders resting on flanges of tier rotating spools in a fixed position, as long as the entire zone (for example, the entire width of the tread) which is to be examined actually appears as part of the picture on the monitor.

If only diameter varies significantly, as may be the case with passenger car sizes for standard and intermediate size cars, measurement of diameter only may be sufficient. In this case, tire supporting spools 171 and 173 may be arranged for motion between a retracted position and a predetermined operating position, and tire supporting spool 172 may be arranged for motion in one direction to a retracted position and in the other direction to a variable operating position in response to a predetermined force adequate for supporting and rotating the tires without excessively deforming them. The diameter measurement can then be translated in a computer to the number of steps required for complete examination of the circumference of the tire.

Many of the benefits of this invention can be realized by placing the tire supporting spools so that they are introduced inside the bead circles and engage the beads rather than the shoulders and treads of the tires. Such an arrangement can permit the same devices to be used for support and rotation of the tire and also for spreading the beads, and in this case it might be preferred for the beads to be spread symmetrically rather than at only one position of the tire. This arrangement with the tire supporting spools engaging the beads could be particularly desirable if there should be some reason for preferring to handle the tires in a vertical rather than horizontal position, as would be the case if the tires are conveyed by simply rolling along a slightly inclined narrow trough. The same kinds of mechanisms can be used, with appropriate changes in dimensions, by mounting them at a right angle to the positions shown in the drawings.

In every variant of the machine of this invention, it provides for automatic positioning, scanning, and discharge of a continuous succession of tires, with display of a succession of still X-Ray pictures of the entire circumference, within a fraction of the time previously required for X-Ray examination. The operator, after start-up and initial adjustment of the imaging system, has essentially nothing to do except view the pictures and judge whether defects are present, and can therefore perform his task economically and without distractions.

We claim:

1. An X-Ray tire inspection machine comprising a conveyor for transmitting a succession of tires to an inspection station and removing them from the inspection station,
    means including several tire supporting spools radially retractible out of the path of the tires on the conveyor and movable into positions for engaging the tread of each tire in succession in the inspection station and rotating the tire on its axis by rotation of the spools on their own different axes,
    an X-Ray source and X-Ray transducer on radially opposite sides of a wall of the tire in the inspection station, and
    means for retracting the X-Ray device from within the tire at the conclusion of the inspection and replacing it when the next tire is placed in the inspection station.

2. An X-Ray tire inspection machine as in claim 1 including means for separating the beads of the tire only in the portion of the tire penetrated by the X-Rays.

3. An X-Ray tire inspection machine as in claim 1, in which the tires are conveyed and inspected in a horizontal posture with the tire axis vertical.

4. An X-Ray tire inspection machine as in claim 3, in which the tires supporting spools engage the tread of the tire and have flanges bearing against the shoulders for lifting the tire out of contact with the conveyor.

5. An X-Ray tire inspection machine as in claim 1, including means for driving the spools intermittently for stepwise rotation of each tire in steps no greater than can be inspected in one position.

6. An X-Ray tire inspection machine as in claim 5, in which the X-Ray transducer includes a fluoroscope screen and closed circuit television for display of a stepwise succession of still pictures of the images on the screen.

7. An X-Ray tire inspection machine as in claim 1, including means for sensing the diameter of each successive tire and for transmitting an electric signal indicative of its diameter, and means responsive to the signal for radially positioning a tire supporting spool.

8. An X-Ray tire inspection machine as in claim 7, including means for driving the spools intermittently for stepwise rotation of each tire in steps no greater than can be inspected in one position.

9. An X-Ray tire inspection machine as in claim 8, in which the X-Ray transducer includes a fluorescent screen and a television camera which integrates the image received from the fluoroscope screen, means for transferring the image to a storage device, and means for displaying the image visually on a television monitor while the next segment of the tire is subjected to X-Ray examination.

10. An X-Ray tire inspection machine as in claim 9, in which the means for sensing the diameter of the tires include a tire support in a fixed position; a tire contact element with power means for moving it into contact with a surface of a tire on the support, pulse generating means connected to the contact element for generating a number of pulses proportional to motion, and means for translating the pulses into motion of the tire supporting spools, and the tire supporting spools include a cylindrical tire tread engaging surface and an axially movable tire shoulder engaging flange.

11. An X-Ray tire inspecting machine as in claim 10, including bead spreaders comprising pairs of fingers freely rotatable about their individual longitudinal axes and laterally projecting from axially movable supports, means for jointly moving the supports into tire bead engaging positions, and means for moving the supports of the separate fingers of each pair equal distances in opposite directions for spreading the beads of a tire.

12. An X-Ray tire inspecting machine as in claim 11, in which the means for jointly moving the supports for the fingers include means for axial motion to and from the location of a tire and means for swiveling about the axis of the supports for engaging and disengaging the beads, and the means for moving the supports in opposite directions include a rack connected to each support and a freely rotatable pinion connected to the means for jointly moving the supports and engaging both racks.

13. In an X-Ray tire inspection machine, tire supporting spools comprising a cylindrical tire tread engaging surface, an axially movable tire shoulder engaging flange, means for programmed radial and axial motion to a predetermined position for support of a tire in an inspection station, and means for rotating the spools for presentation of the circumference of the tire for inspection.

14. In an X-Ray tire inspection machine, bead spreaders comprising pairs of fingers freely rotatable about their individual longitudinal axes and laterally projecting from axially movable supports, means for jointly moving the supports and fingers of each pair into fixed tire bead engaging positions for free rotation of the fingers on the inside of the beads as the tire is rotated, and means for moving the supports of the separate fingers of each pair equal distances in opposite directions for spreading the beads of a tire.

15. In an X-Ray tire inspection machine as in claim 14, the means for jointly moving the supports include means for axial motion to and from the location of a tire and means for swiveling about the axis of the supports for engaging and disengaging the beads, and the means for moving the supports in opposite directions include a rack connected to each support and a freely rotatable pinion connected to the first mentioned means and engaging both racks.

* * * * *